(12) United States Patent
Turchetto et al.

(10) Patent No.: US 8,909,665 B2
(45) Date of Patent: Dec. 9, 2014

(54) SUBSNIPPET HANDLING IN SEARCH RESULTS

(75) Inventors: Riccardo Turchetto, San Francisco, CA (US); Tejas Nadkarni, Bellevue, WA (US); Daniel Marantz, Bellevue, WA (US); David Ahn, San Francisco, CA (US); Franco Salvetti, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 13/220,726

(22) Filed: Aug. 30, 2011

(65) Prior Publication Data

US 2013/0054574 A1    Feb. 28, 2013

(51) Int. Cl.
G06F 17/30    (2006.01)
G06F 7/00    (2006.01)

(52) U.S. Cl.
CPC .... *G06F 17/30719* (2013.01); *G06F 17/30861* (2013.01); *G06F 17/30696* (2013.01)
USPC .......................................... 707/765; 707/729

(58) Field of Classification Search
USPC ................................................ 707/765, 729
See application file for complete search history.

(56) References Cited

U.S. PATENT DOCUMENTS

| | | | |
|---|---|---|---|
| 6,631,373 B1 * | 10/2003 | Otani et al. ........................... | 1/1 |
| 7,587,387 B2 | 9/2009 | Hogue | |
| 7,739,599 B2 | 6/2010 | Patten et al. | |
| 7,783,633 B2 | 8/2010 | Florian et al. | |
| 7,853,587 B2 | 12/2010 | Groeneveld et al. | |
| 8,230,343 B2 | 7/2012 | Logan et al. | |
| 8,270,303 B2 | 9/2012 | Sauerwein, Jr. et al. | |
| 2002/0120925 A1 | 8/2002 | Logan | |
| 2003/0093790 A1 | 5/2003 | Logan et al. | |
| 2005/0278314 A1 | 12/2005 | Buchheit | |
| 2006/0206912 A1 | 9/2006 | Klarfeld et al. | |
| 2006/0251382 A1 | 11/2006 | Vronay et al. | |
| 2007/0266022 A1 | 11/2007 | Frumkin et al. | |
| 2008/0120546 A1 | 5/2008 | Pulier | |
| 2008/0235209 A1 | 9/2008 | Rathod et al. | |
| 2008/0288869 A1 | 11/2008 | Ubillos | |
| 2009/0070322 A1 | 3/2009 | Salvetti et al. | |
| 2009/0116812 A1 | 5/2009 | O'Brien et al. | |
| 2009/0198667 A1 | 8/2009 | Groeneveld et al. | |

(Continued)

OTHER PUBLICATIONS

Teevan, et al., "Visual Snippets: Summarizing Web Pages for Search and Revisitation", Retrieed at <<http://research.microsoft.com/en-us/um/people/cutrell/CHI09-TeevanEtal-VisualSnippets.pdf>>, Proceedings of the 27th international conference on Human factors in computing systems, Apr. 4-9, 2009.

(Continued)

*Primary Examiner* — Kuen Lu
(74) *Attorney, Agent, or Firm* — Dave Ream; Jim Ross; Micky Minhas

(57) ABSTRACT

Architecture that enables an optional display of a longer version of each subsnippet in response to user interactions such as clicking, hovering, or other suitable form of interaction. More specifically, options are provided to display additional text from a search result at the point where a subsnippet (a subsegment in a snippet that is delimited by ellipses) ends. Selecting suitable boundaries for both initial subsnippets and expanded subsnippets enables relevant information to be presented and increased readability.

14 Claims, 8 Drawing Sheets

(56) References Cited

U.S. PATENT DOCUMENTS

| | | |
|---|---|---|
| 2009/0241018 A1 | 9/2009 | Costello et al. |
| 2010/0005092 A1 | 1/2010 | Matson |
| 2010/0205200 A1 | 8/2010 | Hsieh et al. |
| 2010/0228744 A1 | 9/2010 | Craswell et al. |
| 2010/0293466 A1 | 11/2010 | O'Brien |
| 2011/0153577 A1* | 6/2011 | Dean et al. .................. 707/693 |
| 2012/0042231 A1* | 2/2012 | Fontes et al. ................. 715/205 |
| 2012/0238254 A1 | 9/2012 | Yankovich et al. |

OTHER PUBLICATIONS

Pasca, Marius, "Answering Definition Questions via Temporally-Anchored Text Snippets", Retrieved at <<http://aclweb.org/anthology/I/I08/I08-1054.pdf>>, Proceedings of the 3rd International Joint Conference on Natural Language Processing, 2008.

Satoh et al, "Name-it: Naming and Detecting Faces in News Videos," Jan.-Mar. 1999, MultiMedia, IEEE, vol. 6, Issue 1, pp. 23-35.

Casares et al., "Simplifying Video Editing Using Metadata," 2002, DIS '02 Proceedings of the 4th Conference on Designing Interactive Systems: Processes, Practices, Methods and Techniques, pp. 157-166.

Microsoft Corp., "Windows Media Player," 2004, pp. 1-206.

White et al., "A Task-Oriented Study on the Influencing Effects of Query-Biased Summarisation in Web Searching", retrieved at http://citeseerx.ist.psu.edu/viewdoc/download?doi=10.1.1.106.5364&rep=rep1&type=pdf, In the Proceedings of Information Processing and Management: an International Journal, vol. 39, Issue 5, 2003.

Geraci et al., "Cluster Generation and Cluster Labelling for Web Snippets: A Fast and Accurate Hierarchical Solution", Retrieved at http://wwwold.iit.cnr.it/staff/marco.pellegrini/papiri/SPIRE06%28GPMS%29-final.pdf, In the Proceedings of the 13th International Conference of String Processing and Information Retrieval, Oct. 11-13, 2006.

Zamir et al., "Grouper:A Dynamic Clustering Interface to Web Search Results", Retrieved at http://www8.org/w8-papers/3a-search-query/dynamic/dynamic.html, In the Proceedings of Eight International World Wide Web Conference, May 11-15, 1999.

"OneVision", Retrieved at http://ilabs.microsoft.com/Project/Pages/Project.aspx?Projectid=6. Retrieved Date: Jun. 13, 2011, pp. 2.

Grotta et al., "Adobe Premiere Elements 8 Video Editing Software", Retrieved at http://www.washingtonpost.com/wp-dyn/content/article/2009/09/23/AR2009092300229.html, Sep. 27, 2009, pp. 3.

Li et al., "Video Parsing Based on Head Tracking and Face Recognition", Retrieved at http://media.cs.tsinghua.edu.cn/-imagevision/papers/civr07-"LiPX-1569028337.pdf. Proceedings of the 6th ACM International Conference on Image and Video Retrieval, Jul. 9-11, 2007, pp. 8.

Muchmore, Michael, "The Best Home Video-Editing Software", Retrieved at http://www.pcmag.com/article2/0,2817,2383523,00.asp, Apr. 14, 2011, pp. 5.

Muchmore, Michael, "Google Picasa 3.8", Retrieved at http://www.pcmag.com/article2/0,2817,2334109,00.asp. Dec. 30, 2010, pp. 6.

Teevan et al., "Visual Snippets: Summarizing Web Pages for Search and Revisitation", Retrieved at http://research.microsoft.com/en-us/um/people/cutrell/CH109-TeevanEtal-VisualSnippets.pdf, Proceedings of the 27th International Conference on Human Factors in Computing Systems, Apr. 4-9, 2009.

Pasca, Marius, "Answering Definition Questions via Temporally-Anchored Text Snippets", Retrieved at http://aclweb.org/anthology/1/I08/I08-1054.pdf, Proceedings of the 3rd International Joint Conference on Natural Language Processing, 2008.

* cited by examiner

SUBSNIPPET HANDLING IN SEARCH RESULTS

BACKGROUND

In response to a user query, an existing web search engine returns a list of results each represented by a short textual description (referred to herein as a "snippet") in addition to a title, a URL, and potentially other information. A snippet can be composed of several subsnippets joined by ellipses. The constraint in display size imposed on each snippet, and consequently its subsnippets, negatively limits the descriptiveness and readability of the snippet, thereby affecting its primary function of informing user clicks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables an optional display of a longer version of each subsnippet in response to user interactions such as clicking, hovering, or other suitable form of interaction. More specifically, options are provided to display additional text from a search result at the point where a subsnippet (a subsegment in a snippet that is delimited by ellipses) ends. Selecting suitable boundaries for both initial subsnippets and expanded subsnippets enables relevant information to be presented and increased readability as well as the context of the subsnippet within the larger document.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
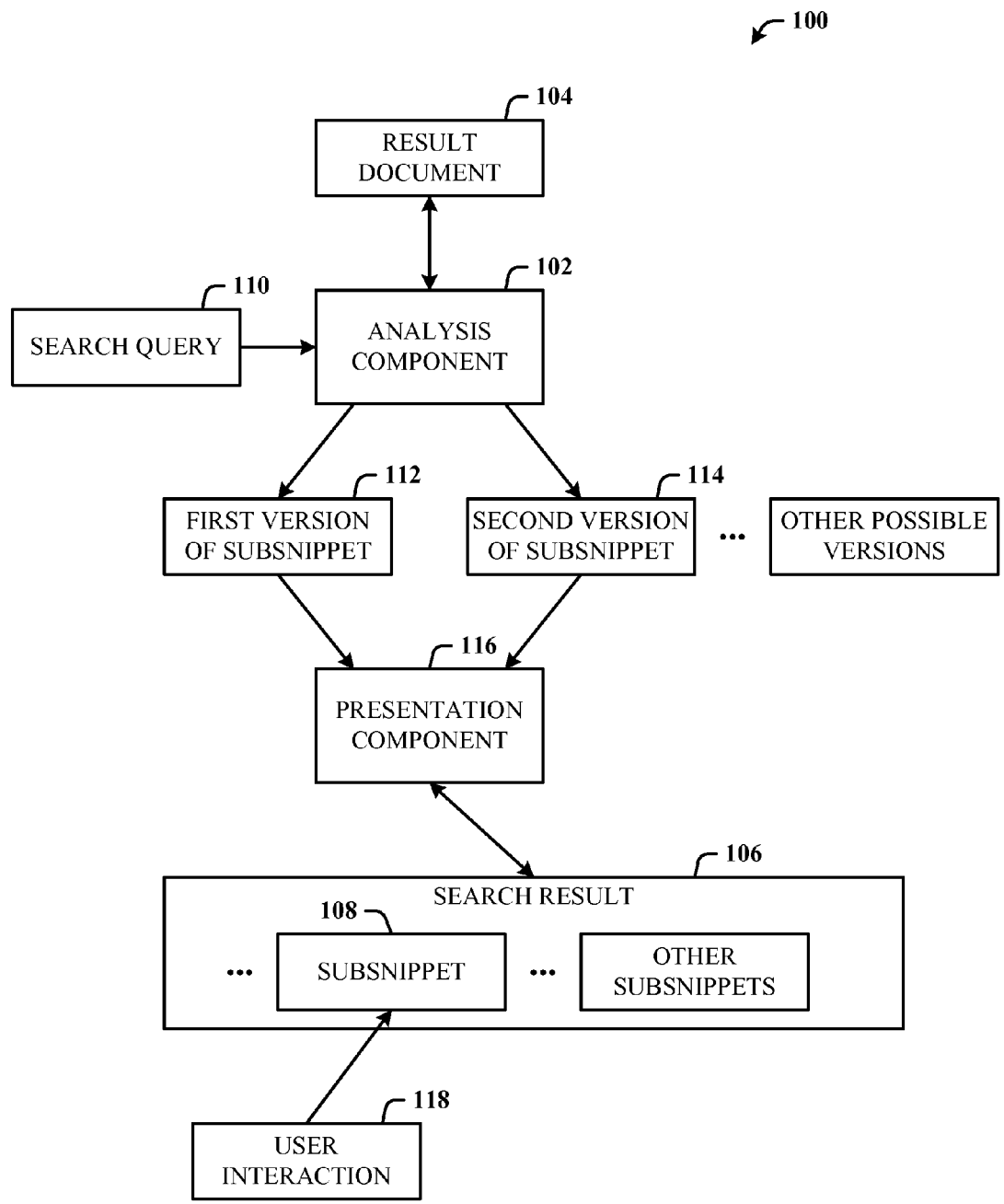
FIG. 1 illustrates a system in accordance with the disclosed architecture.

The disclosed architecture enables presentation (e.g., optional) of a longer version of each subsnippet of a snippet in response to user interactions such as clicking, hovering, and/or other suitable form of interaction.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes an analysis component 102 that processes a result document 104, which document 104 is associated with a search result 106. The document 104 is processed for a subsnippet 108 of descriptive textual information related to a search query 110. The analysis component 102 generates at least a first version 112 and a second version 114 of the subsnippet 108. Other possible versions of the subsnippet 108 can be generated.

A presentation component 116 presents the search result 106 as including the first version 112 of the subsnippet 108. The presentation component 116 switches between the first version 112 and the second version 114 of the subsnippet 108 in response to user interaction 118 with the subsnippet 108. The second version 114 includes more descriptive textual information than the first version 112. The engagement of the user interaction 118 with the subsnippet 108 triggers presentation of the second version 114, and disengagement of the user interaction 118 from the subsnippet 108 triggers presentation of the first version 112.

The user interaction 118 with the subsnippet 108 triggers the presentation component 116 to replace the first version 112 with the second version 114. Alternatively, the user interaction 118 with the subsnippet triggers the presentation component to append the second version 114 to the first version 112.

The analysis component 102 selects an amount and quality of the descriptive textual information for the subsnippet 108 that is readable and relevant to the query 110. The analysis component 102 segments the document 104 into sections and assigns each segment a quality score. The analysis component 102 selects a subset of query term matches in the document 104 and uses the subset as starting points in construction of corresponding individual subsnippets (e.g., subsnippet 108). The analysis component 102 selects a suitable amount of context for each query term match and subsnippet version (e.g., first version 112 and second version 114).

Figure 2:
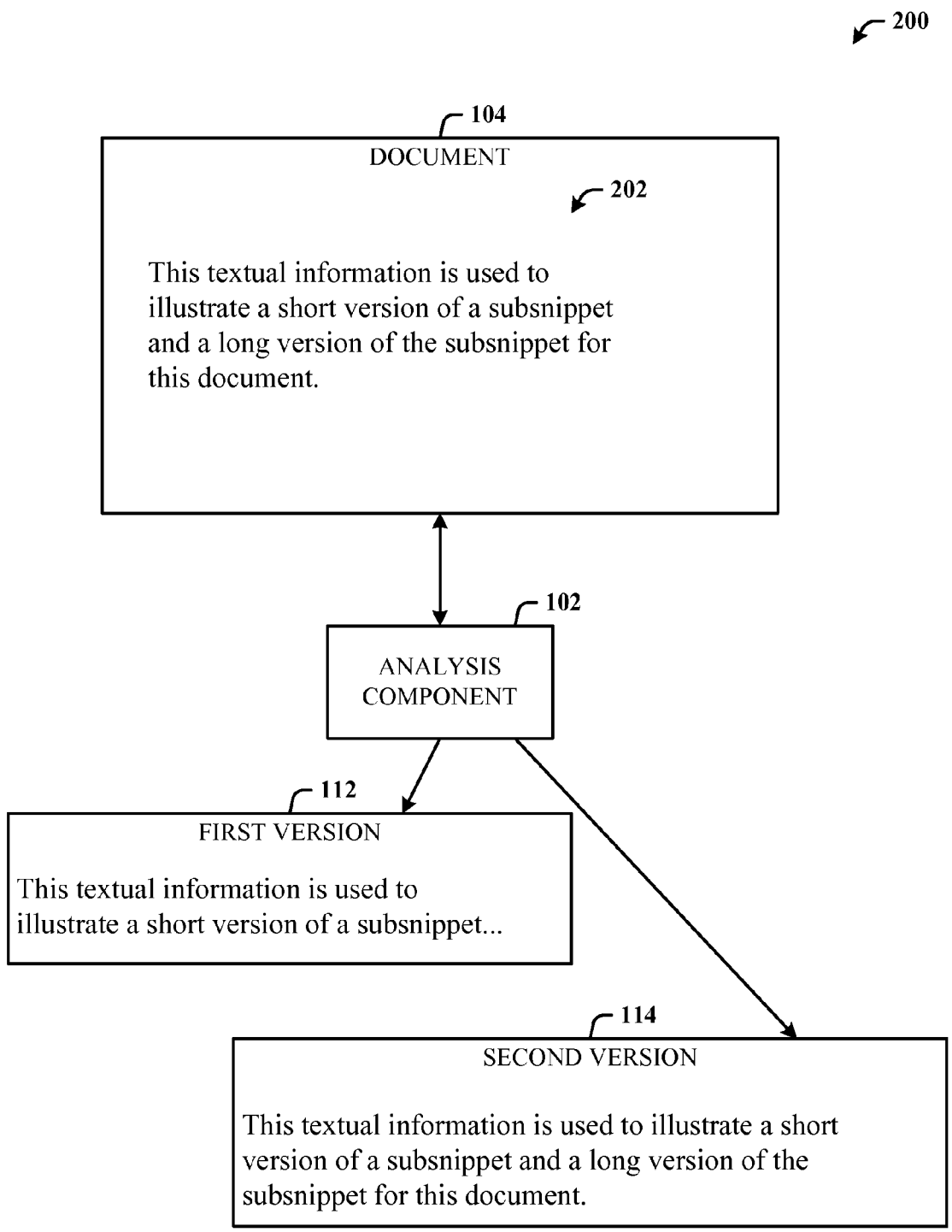
FIG. 2 illustrates a system of subsnippet version creation from the result document.

FIG. 2 illustrates a system 200 of subsnippet version creation from the result document 104. Here, the document 104 includes textual information 202 relevant to the search query. The analysis component 102 determines boundaries for the various versions of the textual information 202 such as for the first version 112 and the second version 114. In this exemplary implementation, the first version 112 and second version 114 are swapped back and forth into and out of presentation based on the engagement or disengagement of the user interaction with the subsnippet. It then appears to the user that, when hovering a pointer over the subsnippet, for example, the textual information of the first version is added to or expanded, when actually, the versions are swapped.

As previously indicated, it can also be the alternative case where the second version 114 includes only the textual information beyond that shown for the first version 112, and hence, the second version 114 is appended to the first version 112 to appear as the larger version currently illustrated in the second version 114.

Following is a more specific description of the subsnippet processing in accordance with the disclosed architecture. In order to provide additional text from the search result to display a longer version of each subsnippet, the following actions can be taken. The associated document 104 is segmented into sections and each section is assigned a quality score. A subset of query term matches in the document is selected to be used as a starting point in the construction of individual subsnippets.

Short and long versions of each subsnippet are then generated by including a suitable amount of context surrounding the query term match selected as its starting point. The exact amount, as well as the boundaries of the surrounding context to be included, is determined by linguistic properties of the document section in which the query term match belongs. Examples of natural context boundaries are sentence boundaries, commas, semicolons, parentheses, and other punctuation characters (or symbols). Document sections can also be considered as natural boundaries, although entire sections can be omitted the associated scores are below a predetermined score threshold. The selection of the left and right boundary pair among all possible pairs for each subsnippet can also be performed.

The short and long version of each subsnippet is then transferred to the presentation layer responsible for displaying the subsnippets as appropriate depending on user engagement with each individual subsnippet. The presentation layer relies on user-initiated actions on the snippet area to contextually increase the size of the subsnippets where the user finds it desirable to continue reading the sentence past its previously constrained breakpoints.

Figure 3:
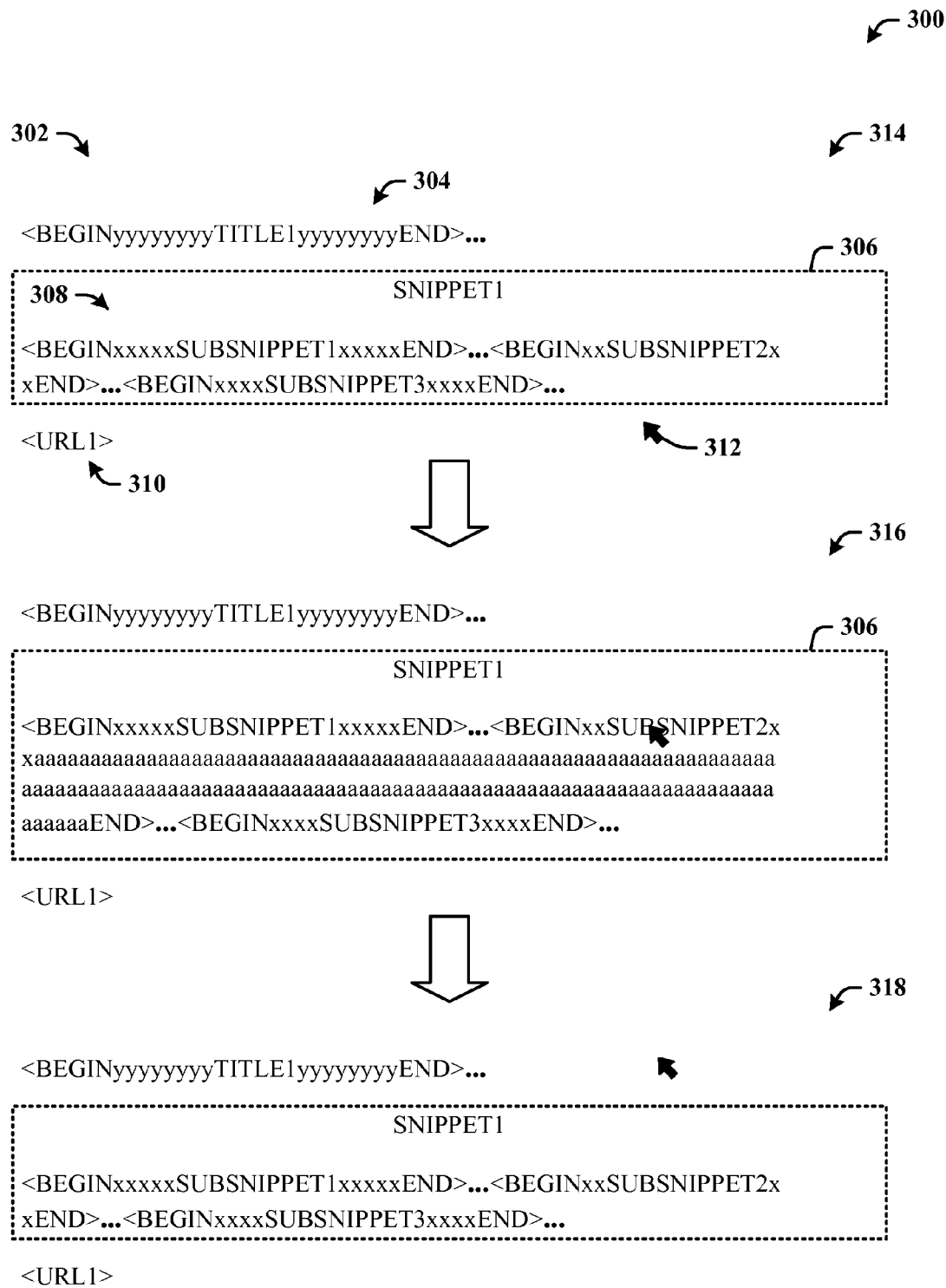
FIG. 3 illustrates a flow diagram of subsnippet presentation of a search result.

FIG. 3 illustrates a flow diagram 300 of subsnippet presentation of a search result 302. The search result 302 includes a title (TITLE1) 304, a snippet (SNIPPET1) 306, one or more subsnippets 308 of descriptive textual information as part of the snippet 306, and a URL (URL1) 310. Here, the snippet 306 includes three subsnippets 308: a first subsnippet (SUBSNIPPET1) that comprises textual information with a beginning and an end, a second subsnippet (SUBSNIPPET2) that comprises textual information with a beginning and an end, a third subsnippet (SUBSNIPPET3) that comprises textual information with a beginning and an end. In this instance, each of the subsnippets 308 is delimited with en ellipsis ( . . . ). Here, user interaction is by way of a mouse pointer 312.

As presented in the top rendering 314 by the presentation component, the pointer 312 is not engaged (disengaged) with the second subsnippet of the search result 302; hence, no expansion of the second subsnippet occurs. As presented in the middle rendering 316 by the presentation component, the pointer 312 is engaged (hovering over) with the second subsnippet of the search result 302; hence, expansion of the second subsnippet occurs. As presented in the bottom rendering 318 by the presentation component, the pointer 312 is again disengaged with the second subsnippet of the search result 302; hence, presentation of the second subsnippet occurs similar to the top rendering 314.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
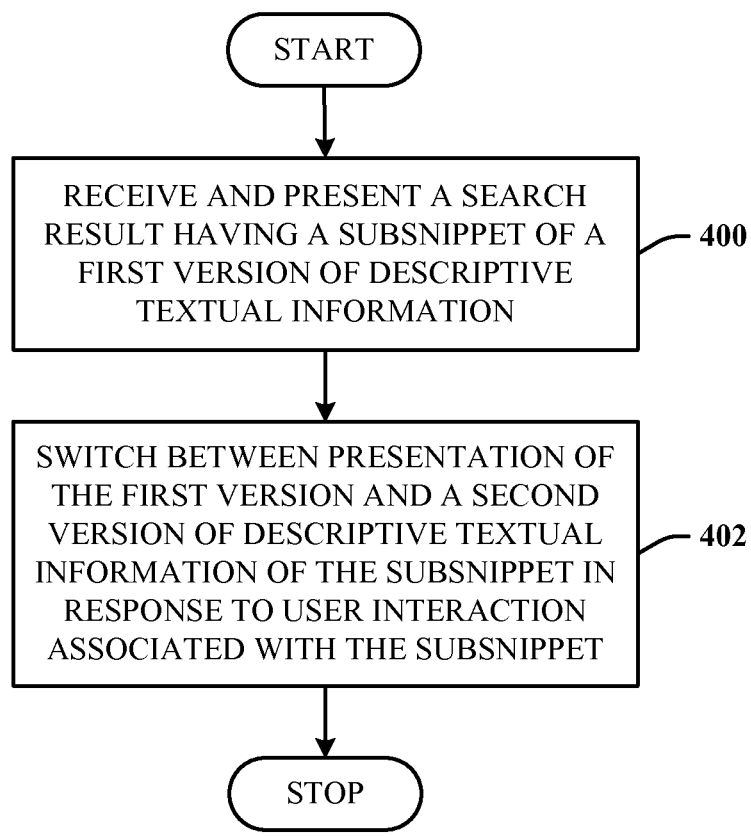
FIG. 4 illustrates a computer-implemented method of subsnippet processing in accordance with the disclosed architecture.

FIG. 4 illustrates a computer-implemented method of subsnippet processing in accordance with the disclosed architecture. At 400, a search result having a subsnippet of a first version of descriptive textual information is received and presented. At 402, presentation of the first version and a second version of descriptive textual information of the subsnippet is switched between in response to user interaction associated with the subsnippet.

Figure 5:
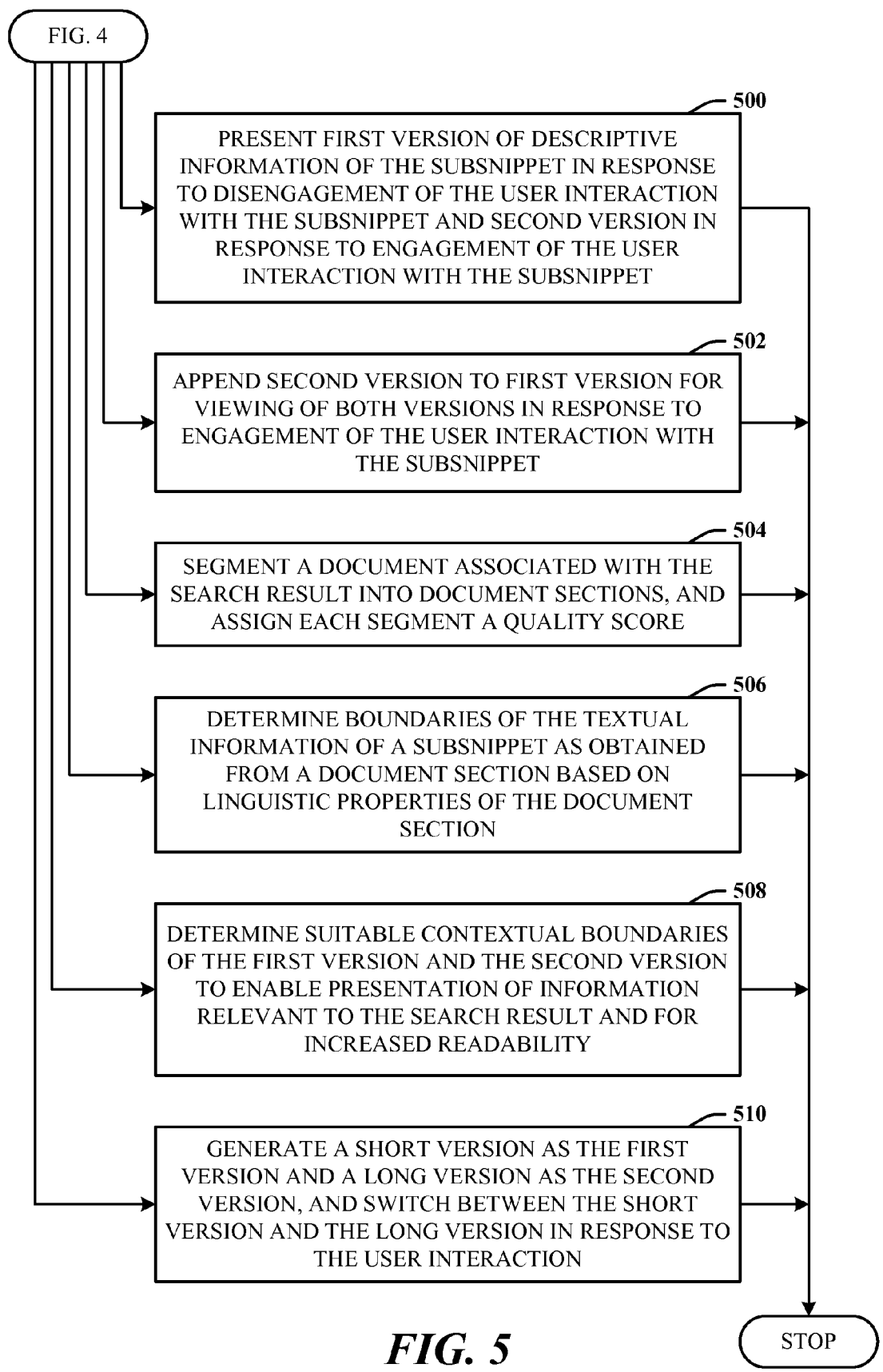
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, the first version of descriptive information of the subsnippet is presented in response to disengagement of the user interaction with the subsnippet and the second version is presented in response to engagement of the user interaction with the subsnippet. At 502, the second version is appended to the first version for viewing of both versions in response to engagement of the user interaction with the subsnippet.

At 504, a document associated with the search result is segmented into document sections, and each segment is assigned a quality score. At 506, boundaries of the textual information of a subsnippet are determined as obtained from a document section based on linguistic properties of the document section. At 508, suitable contextual boundaries of the first version and the second version are determined to enable presentation of information relevant to the search result and for increased readability. At 510, a short version is generated as the first version and a long version is generated as the second version, and switching occurs between the short version and the long version in response to the user interaction.

Figure 6:
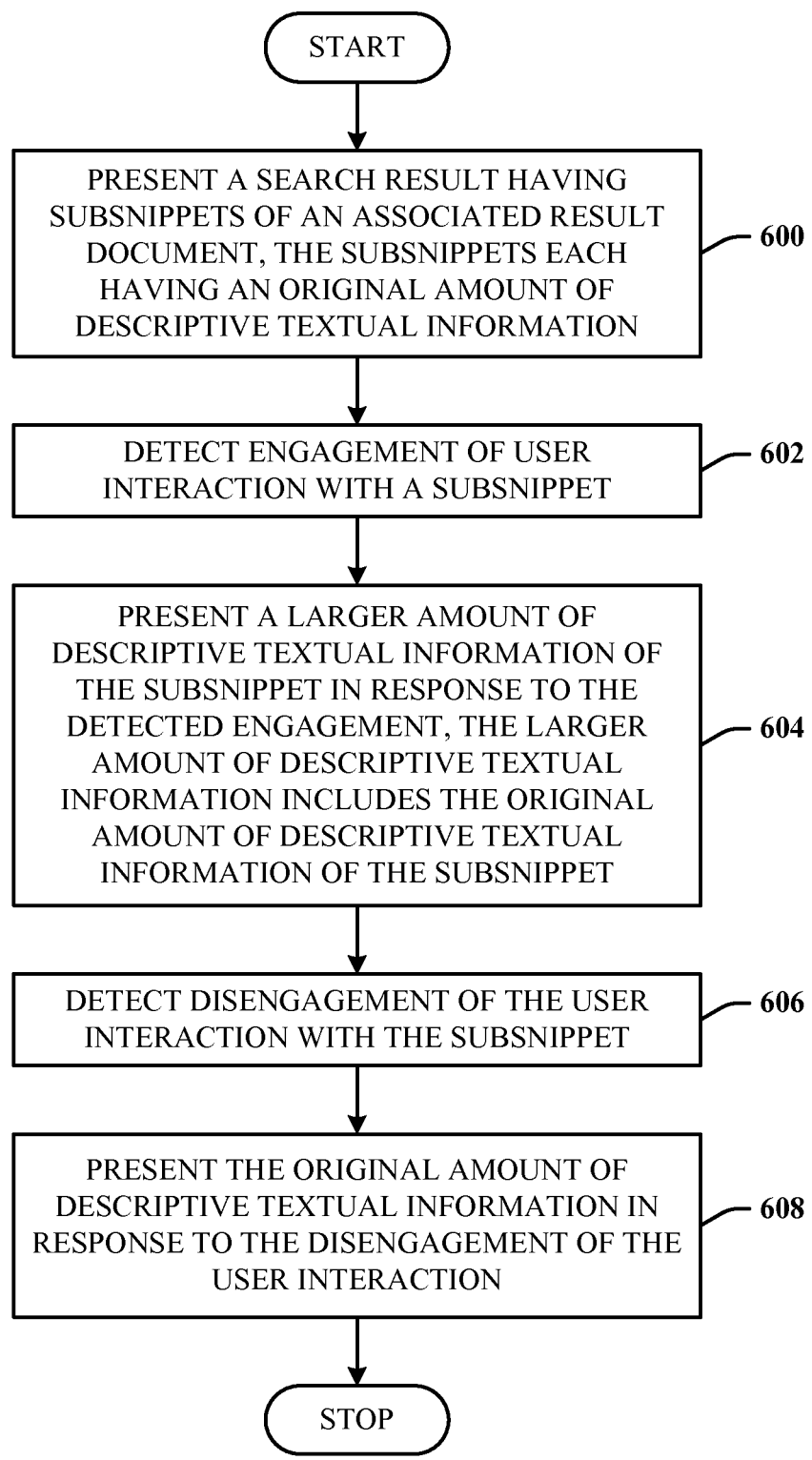
FIG. 6 illustrates an alternative method of subsnippet processing.

FIG. 6 illustrates an alternative method of subsnippet processing. At 600, a search result is presented having subsnippets of an associated result document, the subsnippets each having an original amount of descriptive textual information. At 602, engagement of user interaction with a subsnippet is detected. At 604, a larger amount of descriptive textual information of the subsnippet is presented in response to the detected engagement. The larger amount of descriptive textual information includes the original amount of descriptive textual information of the subsnippet. At 606, disengagement of the user interaction with the subsnippet is detected. At 608, the original amount of descriptive textual information is presented in response to the disengagement of the user interaction.

Figure 7:
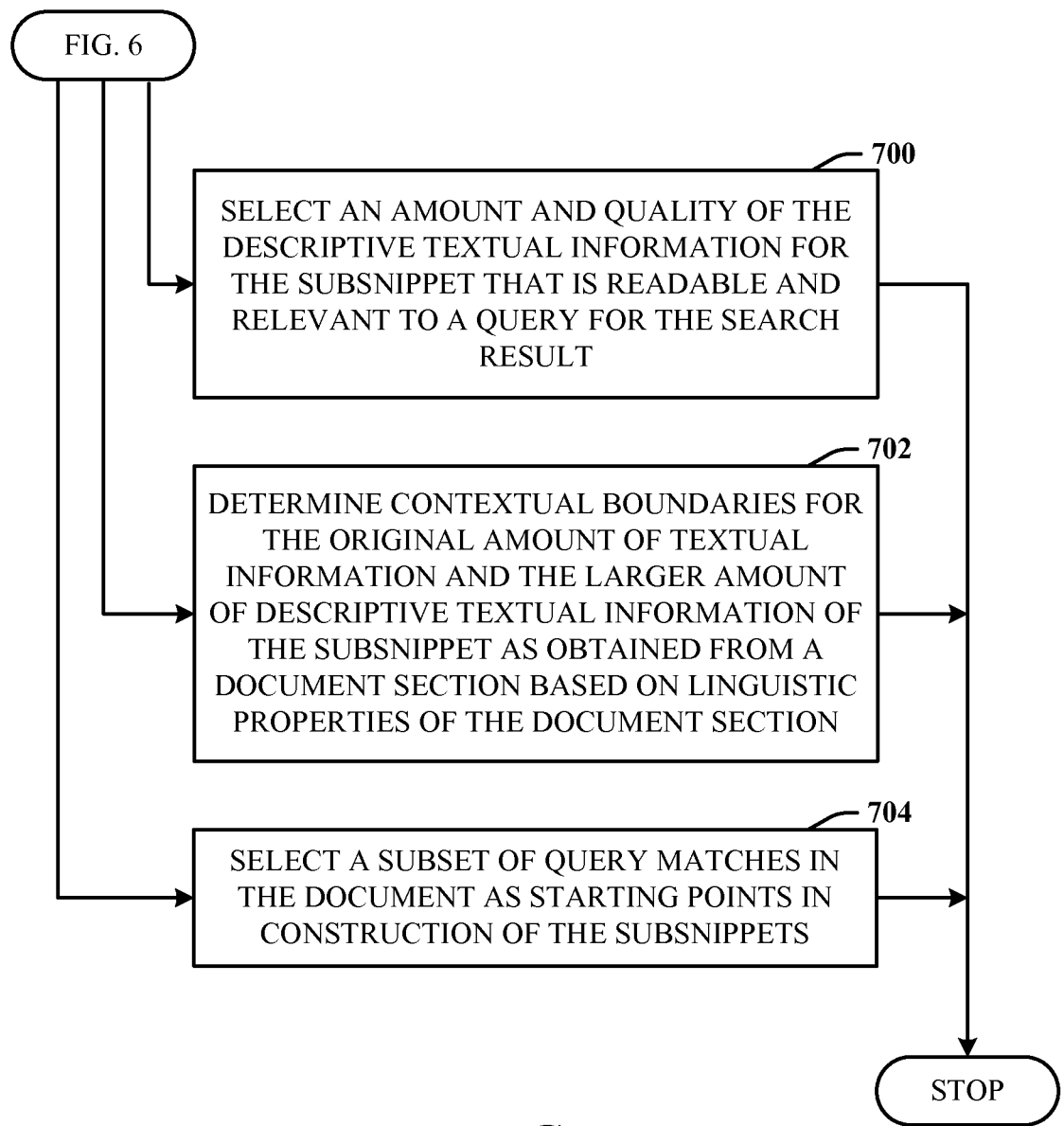
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, an amount and quality of the descriptive textual information for the subsnippet is selected that is readable and relevant to a query for the search result. At 702, contextual boundaries for the original amount of textual information and the larger amount of descriptive textual information of the subsnippet as obtained from a document section are determined based on linguistic properties of the document section. At 704, a subset of query matches in the document is selected as starting points in construction of the subsnippets.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
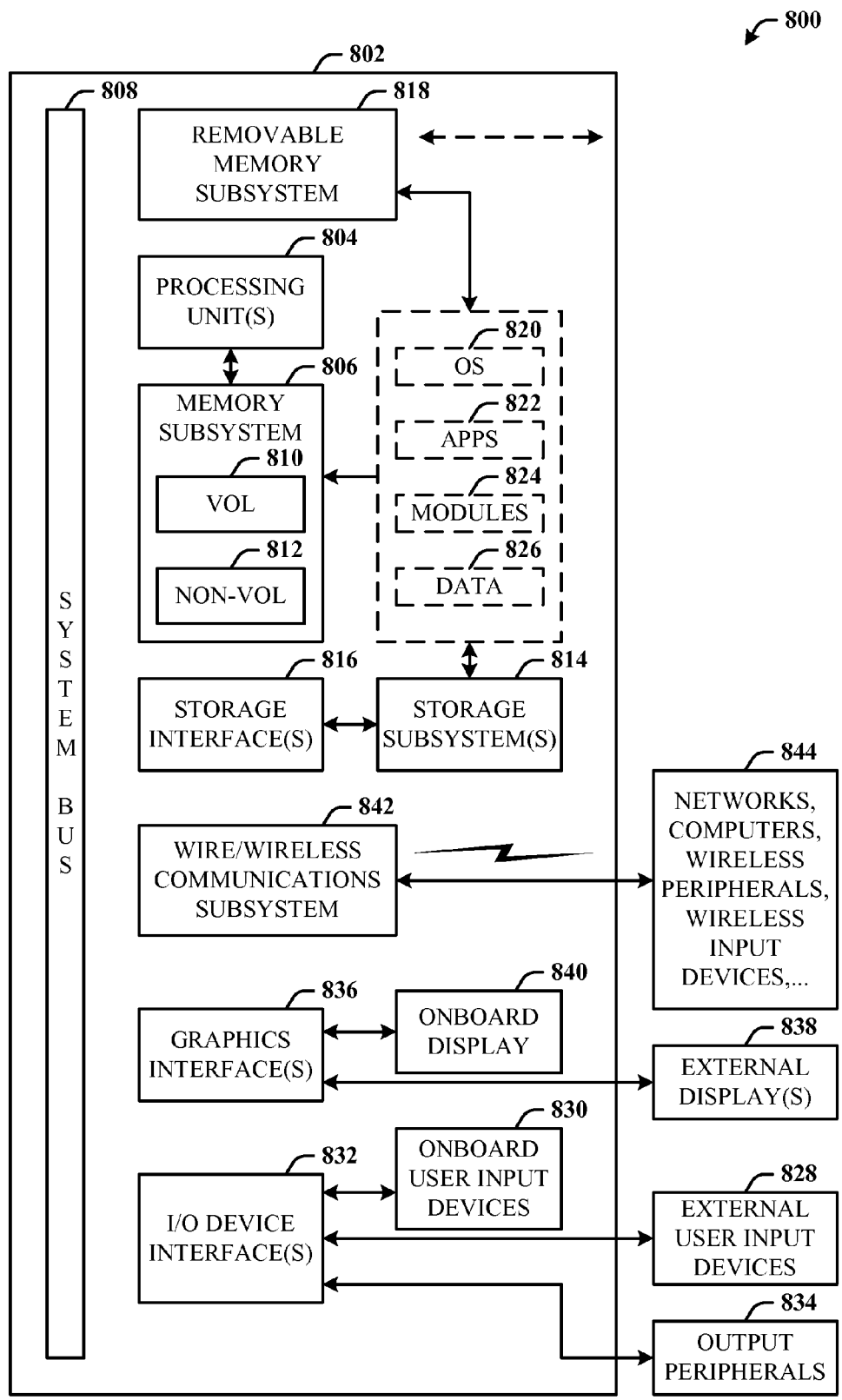
FIG. 8 illustrates a block diagram of a computing system that executes subsnippet processing in accordance with the disclosed architecture.

Referring now to FIG. 8, there is illustrated a block diagram of a computing system 800 that executes subsnippet processing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the system 200 of FIG. 2, the entities and flow of the diagram 300 of FIG. 3, and the methods represented by the flowcharts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
an analysis component that (i) processes a result document, the result document is associated with a search result and, for each result document:
segments the document into sections and assigns each segment a quality score; and
from a sub-portion of each segment, forms a subsnippet of descriptive textual information related to a search query, and (ii) generates at least a first version and a second version of the subsnippet;
a presentation component that presents the search result as including the first version of the subsnippet, the presentation component switches between the first version and the second version of the subsnippet in response to user interaction with the subsnippet; and
a microprocessor that executes computer-executable instructions associated with at least one of the analysis component or the presentation component,
wherein the user interaction with the subsnippet triggers the presentation component to append the second version of the subsnippet to the first version of the subsnippet and to present a result of the appending operation as a single, combined version, such that both versions are presented together as the subsnippet.

2. The system of claim 1, wherein the second version includes more descriptive textual information than the first version.

3. The system of claim 1, wherein engagement of the user interaction with the subsnippet triggers presentation of the second version and disengagement of the user interaction from the subsnippet triggers presentation of the first version.

4. The system of claim 1, wherein the user interaction with the subsnippet triggers the presentation component to replace the first version with the second version.

5. The system of claim 1, wherein the analysis component selects an amount and quality of the descriptive textual information for the subsnippet that is readable and relevant to the query.

6. The system of claim 1, wherein the analysis component selects a subset of query term matches in the document and uses the subset as starting points in construction of corresponding individual subsnippets.

7. The system of claim 1, wherein the analysis component selects a suitable amount of context for each query term match and subsnippet version.

8. A computer-implemented method, comprising acts of:
determining, based on linguistic properties of a document section, boundaries of descriptive textual information of a subsnippet that is obtained from the document section of a search result;
presenting the subsnippet as a first version of the descriptive textual information;

switching between presentation of the first version and a second version of the descriptive textual information of the subsnippet in response to user interaction associated with the subsnippet; and obtaining a single, combined version of the second version and the first version by combining the first and second versions for viewing of both versions together, in response to the user interaction.

9. The method of claim 8, further comprising presenting the first version of descriptive information of the subsnippet in response to disengagement of the user interaction with the subsnippet and the second version in response to engagement of the user interaction with the subsnippet.

10. The method of claim 8, further comprising segmenting a document associated with the search result into document sections, and assigning each segment a quality score.

11. The method of claim 8, further comprising determining suitable contextual boundaries of the first version and the second version to enable presentation of information relevant to the search result and for increased readability.

12. The method of claim 11, wherein the determining suitable contextual boundaries of the first version and the second version to enable presentation of information relevant to the search result and for increased readability identifies boundaries based on the linguistic properties of the document section, the document section being a section in which a query term match resides, natural context boundaries, and document sections having associated relevancy scores at or above a predetermined score threshold, each relevancy score being an assigned score based on a relevancy of a segment to which the document section belongs is to a query.

13. The method of claim 8, further comprising generating a short version as the first version and a long version as the second version, and switching between the short version and the long version in response to the user interaction.

14. A storage device encoded with processing instructions that, when executed by one or more processing devices, cause the performance of a method, the method comprising:

determining, based on linguistic properties of the document section, boundaries of descriptive textual information of a subsnippet that is obtained from a document section of a search result;

presenting the subsnippet as a first version of the descriptive textual information;

switching between presentation of the first version and a second version of the descriptive textual information of the subsnippet in response to user interaction associated with the subsnippet; and obtaining a single, combined version of the second version and the first version by combining the first and second versions for viewing of both versions, in response to the user interaction.

\* \* \* \* \*